July 5, 1960
W. S. FRAULA ET AL
2,943,353
MOLDING PRESSES
Filed March 5, 1957
6 Sheets-Sheet 1
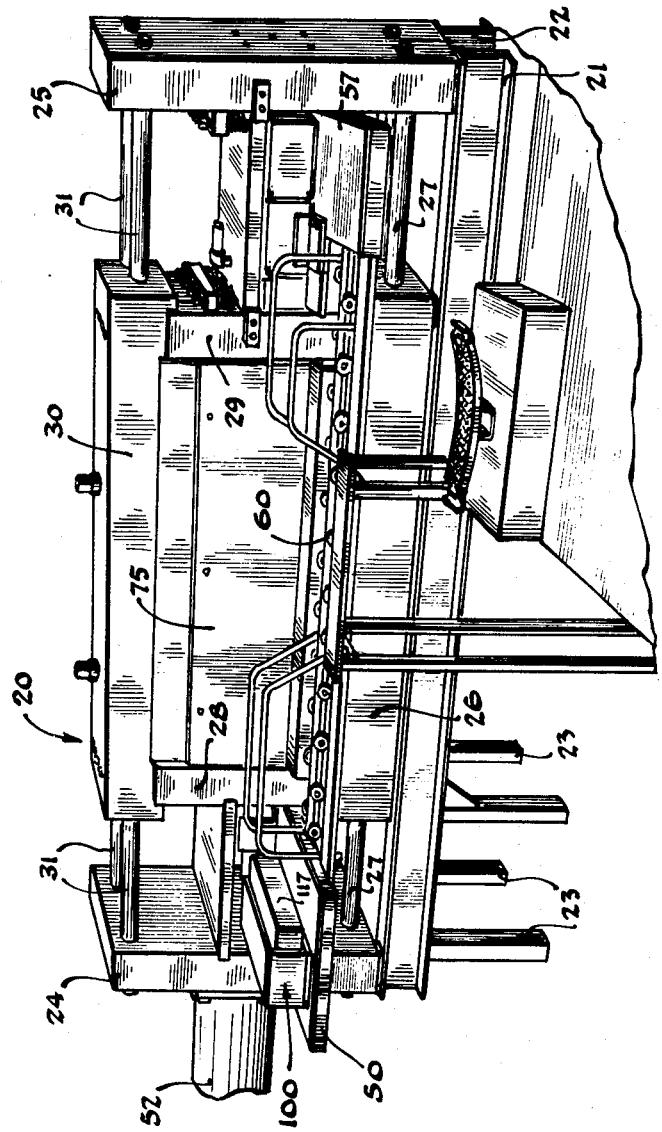
Inventors
William S. Fraula
Walter J. Olson
By   Wallace and Cannon
                Attorneys

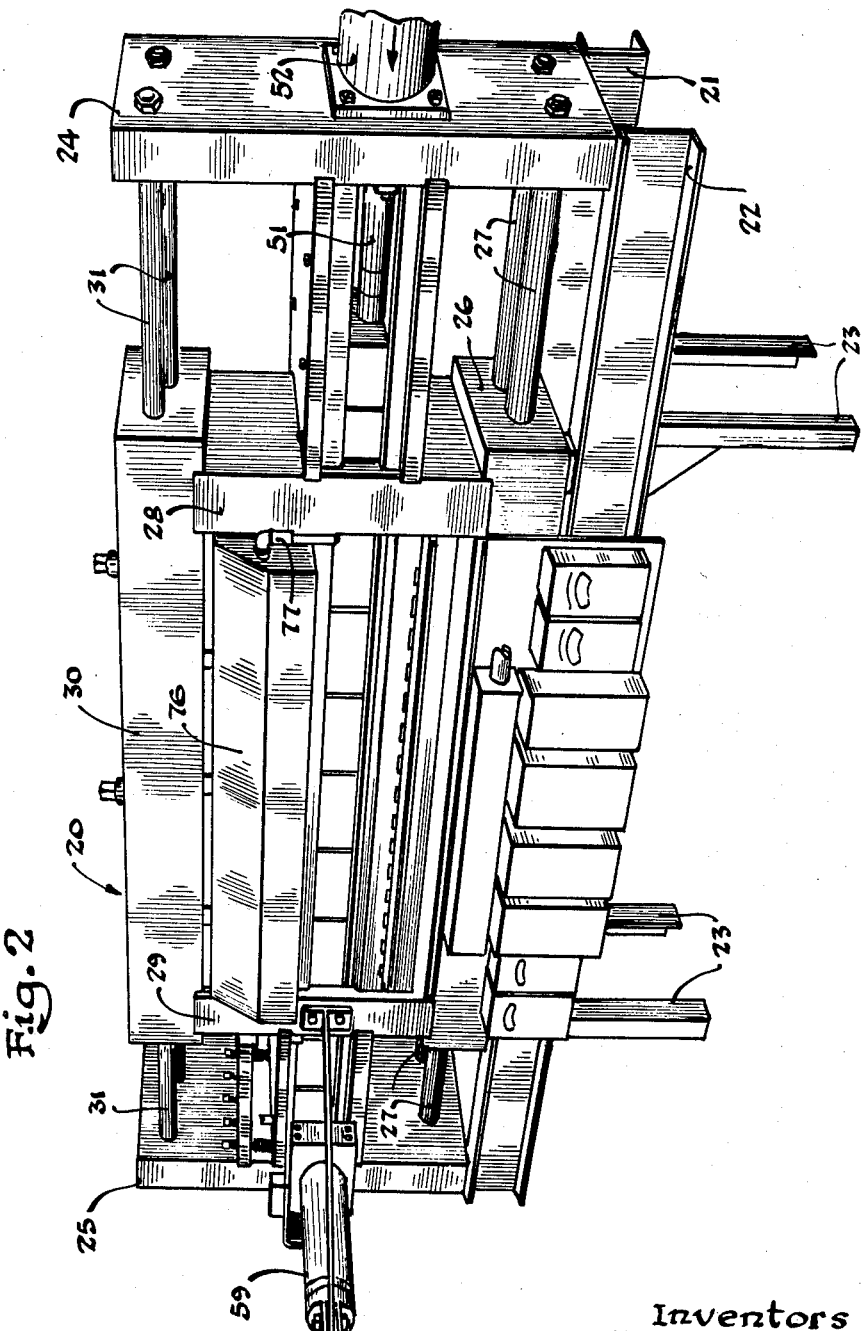

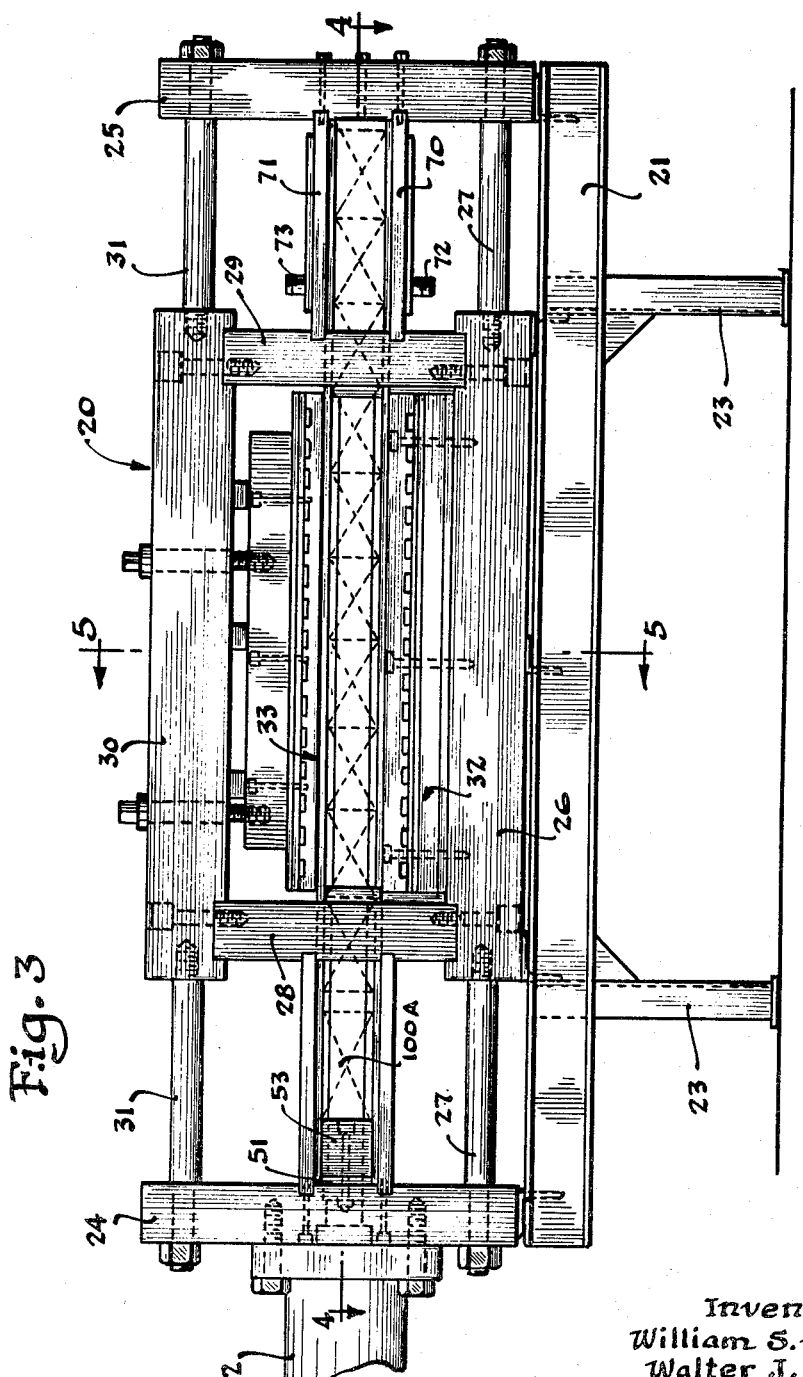

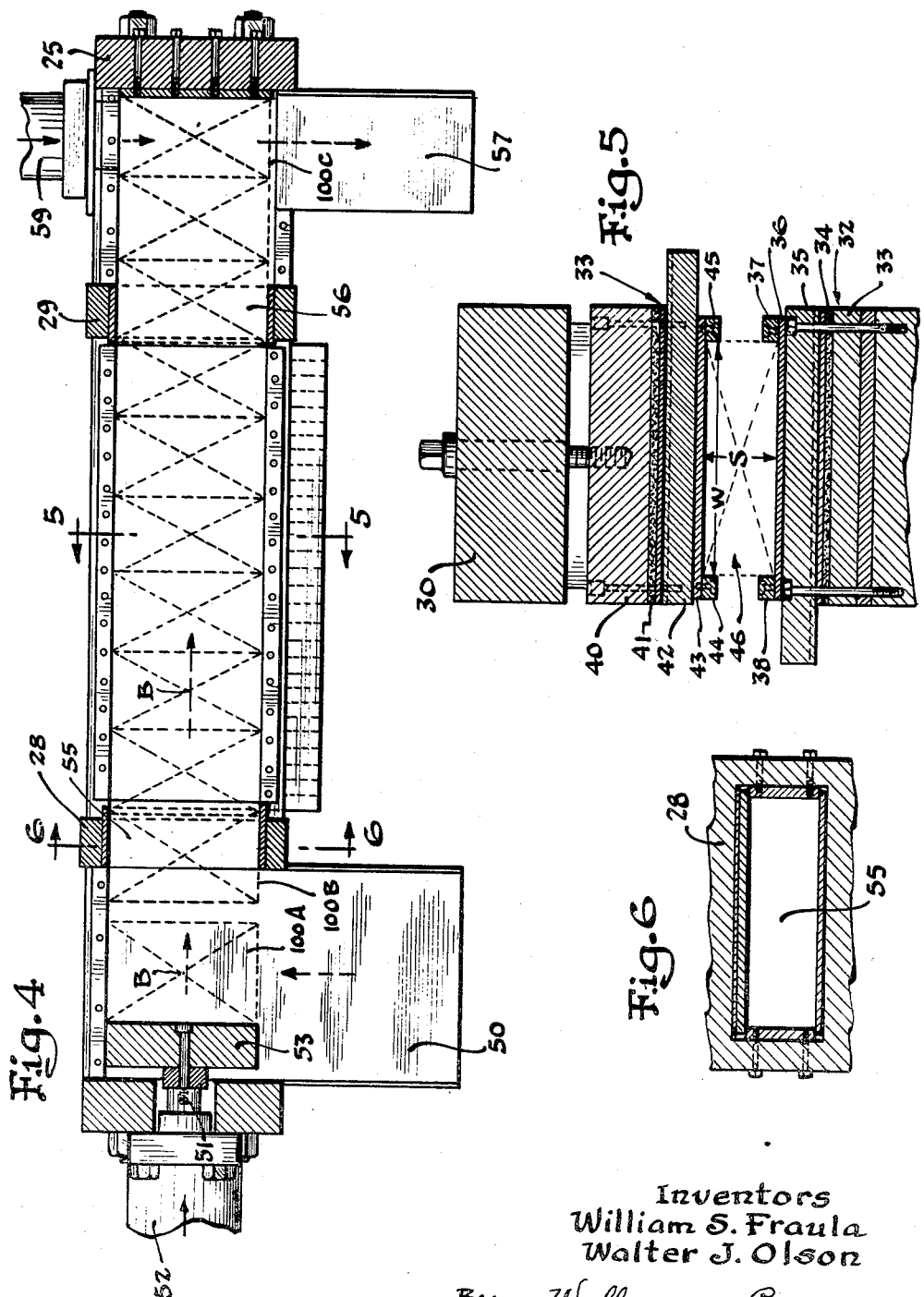

July 5, 1960 W. S. FRAULA ET AL 2,943,353
MOLDING PRESSES
Filed March 5, 1957 6 Sheets-Sheet 5

Inventors
William S. Fraula
Walter J. Olson
By Wallace and Cannon
Attorneys

July 5, 1960
W. S. FRAULA ET AL
2,943,353
MOLDING PRESSES
Filed March 5, 1957
6 Sheets-Sheet 6
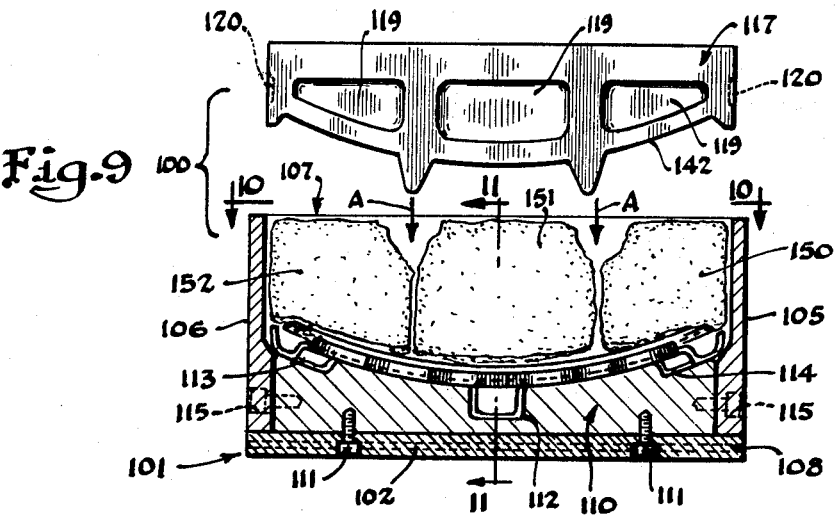
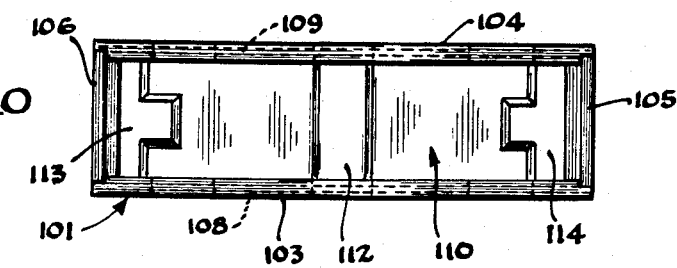
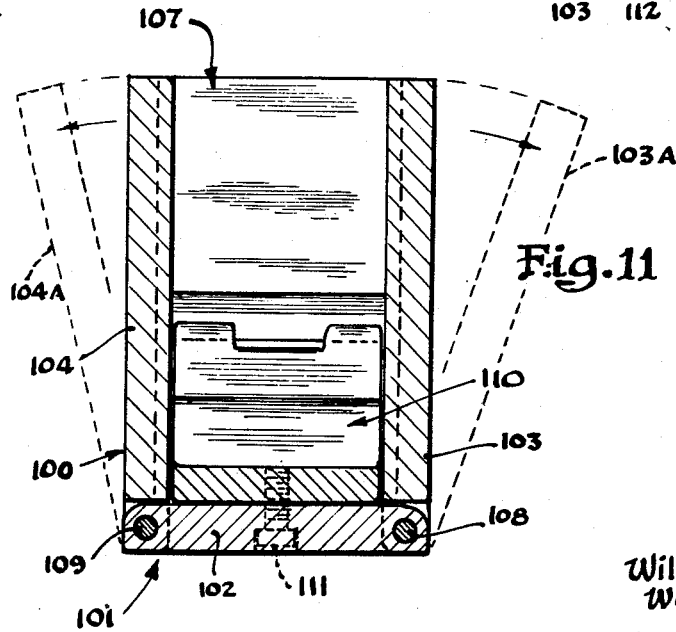
Inventors
William S. Fraula
Walter J. Olson
By Wallace and Cannon
Attorneys

United States Patent Office 2,943,353
Patented July 5, 1960

2,943,353
MOLDING PRESSES

William S. Fraula, Ridgewood, and Walter J. Olson, Packanack Lake, N. J., assignors to American Brake Shoe Company, New York, N.Y., a corporation of Delaware Filed Mar. 5, 1957, Ser. No. 644,144

2 Claims. (Cl. 18—17)

This invention relates to molding apparatus, including molding presses and the molding devices used in conjunction therewith. The invention is particularly advantageous in the curing of thermosetting composition materials in the manufacture of brake shoes and similar applications and is described in that connection.

The brake shoe which has long been standard in the railroad industry comprises a cast iron body, usually reinforced by a steel member positioned at the back of the brake shoe. In at least some railway applications, however, it has been proposed that these standard brake shoes be replaced with a composition type shoe comprising a composition brake shoe body and a metal back or support structure. The composition material employed for brake shoes of this type may, for example, comprise comminuted friction material of various types distributed in a thermosetting binder. In fabricating the brake shoe, it is necessary to carry out the final curing or molding stage of the manufacturing process with the composition material and metal back encased in a common mold in order that the brake shoe body may be adequately bonded to the metal back and preferably mechanically secured thereto.

There are a number of different types of molding presses presently available in the art which are suitable for use in the manufacture of molded composition bodies such as brake linings and the like. For example, a press which is highly advantageous in the manufacture of brake linings and similar articles is described and claimed in the co-pending application of William S. Fraula and Harry M. King, Ser. No. 441,094, filed July 2, 1954. These presses, however, are not especially well adapted to the manufacture of a composite structure such as the metal backed composition brake shoe proposed for railway service. In addition, it may be noted that virtually all of the presently available molding presses utilize relatively large movable platens in conjunction with multiple cavity molds in order to attain the inherent economies of mass production.

In order to enable composition type brake shoes to compete economically with cast iron brake shoes, it is of course essential that the molding presses utilized to fabricate the composition brake shoes be capable of relatively high outputs, thereby reducing the unit cost of the brake shoes. On the other hand, and particularly in view of the fact that composition brake shoes are not as yet standardized in construction, it is usually desirable that the presses be adapted to manufacture brake shoes of different sizes and configurations and with different composition materials. This is particularly true because the applications in which molded composition brake shoes may prove capable of competing with cast iron shoes are relatively specialized in nature and it may accordingly be necessary to manufacture a number of different types of brake shoes to meet the needs and requirements of these specialized applications.

A primary object of the invention, therefore, is the provision of a new and improved apparatus for curing thermosetting compositions under heat and pressure.

Another object of the invention is a new and improved molding press apparatus which is inherently flexible in operation and adapted to the manufacture of a number of different articles yet which retains the economical advantages inherent in mass production devices.

A more specific object of the invention is a new and improved molding press for curing thermosetting compositions under pressure in which the number and size of the moving parts are reduced to a minimum.

A further object of the invention is a new and improved molding device for curing thermosetting composition materials under pressure which permits fabrication of a number of different articles in a single standardized press.

Another important object of the invention is the provision of molding apparatus suitable for the manufacture of composite metal and composition articles which is inherently economical in construction and operation and whichc affords maximum flexibility in operation.

Accordingly, the invention is directed to apparatus suitable for curing thermosetting compositions under heat and pressure; such apparatus constructed in accordance with the invention may comprise, for example, a pair of heated platens of predetermined length supported in fixed parallel relation with respect to each other and separated by a predetermined inter-platen spacing. The apparatus further includes a plurality of drawer-type molds each including an open-ended mold box defining a mold cavity for receiving the composition material to be cured along with any other structure such as a metal reinforcing member which is to form a part of the cured composition article. Each of the molds further includes a die member adapted to be received in the open end of the mold box and to be forced thereinto under pressure, each of the molds having a predetermined minimum length which is very much smaller than the length of the platens and a height which is approximately equal to the inter-platen spacing. A reaction block is disposed at one end of the platens and is spaced therefrom by a predetermined distance substantially larger than the minimum mold length. The apparatus also provides a ram which is arranged for movement longitudinally of the platens and which has a stroke at least equal to the maximum length of the molds. This ram is utilized to impel the molds in series through the inter-platen space in abutting pressure-translating relation to each other and into engagement with the reaction block.

Other and further objects of the present invention will be apparent from the following description and claims and are illustrated in the accompanying drawings which, by way of illustration, show preferred embodiments of the present invention and the principles thereof and what is now considered to be the best mode for applying those principles. Other embodiments of the invention embodying the same or equivalent principles may be used and structural changes may be made as desired by those skilled in the art without departing from the present invention and the purview of the appended claims.

In the drawings:

Fig. 1 is a perspective view of the front of a molding press constructed in accordance with one embodiment of the invention;

Fig. 2 is a perspective view of the opposite side of the molding press shown in Fig. 1;

Fig. 3 is a front elevation view of the molding press of Fig. 1;

Fig. 4 is a longitudinal section view taken along line 4—4 in Fig. 3;

Fig. 5 is a vertical sectional view taken along line 5—5 in Fig. 3;

Fig. 6 is a detailed sectional view of a portion of the molding press taken along line 6—6 in Fig. 4;

Fig. 9 is a plan view, partly in cross section, of the drawer-type mold of Fig. 7;

Fig. 10 is an end view of the mold box taken along line 10—10 in Fig. 9; and

Fig. 11 is a sectional view of the mold box taken along line 11—11 in Fig. 9.

Figure 7:
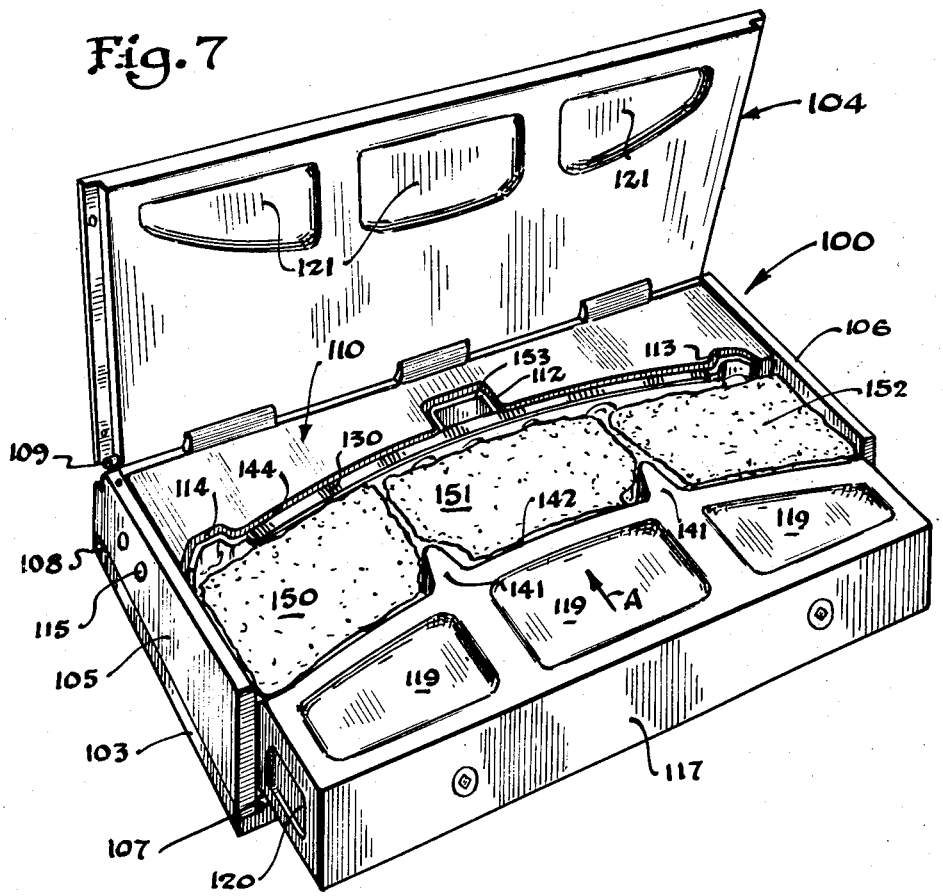
Fig. 7 is a perspective view of a drawer-type mold which may be utilized in conjunction with the molding press of Figs. 1–6.

The molding press 20 illustrated in the several views of Figs. 1–6 is illustrative of one embodiment of the invention and comprises a bench formed by a pair of channel members 21 and 22 supported upon a plurality of legs 23 which may be formed from steel angle members or other suitable structural shapes. A relatively large and heavy mounting block 24 is supported on channels 21—22 at the left hand side of the machine as seen in Figs. 1 and 3; this is the loading end of the press. A similar heavy cast iron reaction block 25 is supported upon the channel members at the opposite end of the press, this being the unloading or ejection end of the press.

A lower bed plate 26 is secured to channel members 21 and 22 at a location intermediate the reaction blocks 24 and 25 and is maintained in fixed position with respect to the reaction blocks as by a plurality of tie members such as the rods 27. A pair of relatively heavy frame members or blocks 28 and 29 are mounted on the bed plate 26 at the input and ejection ends of the press respectively; these blocks are utilized to support an upper bed plate 30 which is maintained in fixed position with respect to the blocks 24 and 25 by a further plurality of tie members such as the rods 31.

A pair of heated platens 32 and 33 are supported within press 20 in fixed parallel relation with respect to each other. As best indicated in Fig. 5, platen structure 32 comprises a base plate 33 supported above bed plate 26, an insulating member 34, a heating device 35, and a surface plate 36 to which two guide members 37 and 38 are secured. Similarly, platen structure 33 includes a base plate 40, an insulating member 41, a heating element 42 and a surface plate 43 to which a pair of guide members 44 and 45 are secured. It is thus seen that the two platens define an inter-platen space 46 having a predetermined height or inter-platen spacing S and a predetermined width W.

The press 20 further includes a loading platform or table 50 at the loading or input end of the press, the upper surface of which is approximately co-planar with the upper surface of lower platen member 36. A ram 51 is included in the press and is arranged for longitudinal movement with respect to the platens 32 and 33; in operation, the ram is actuated by a cylinder 52 and forces a pressure block 53 across the surface of the loading table, the pressure block being aligned with the inter-platen space 46. The support block 28, as indicated in Figs. 4 and 6, is provided with an entrance aperture 55 which is utilized to guide molds into the inter-platen space as will be described more completely hereinafter; similarly, the frame member 29 affords a similar guiding aperture 56 at the exit or discharge end of the press.

The discharge end of press 20 is provided with an unloading platform or table 57; like loading table 50, this table is aligned with the upper surface of the lower platen 32. The unloading table is positioned immediately adjacent the discharge end reaction block 25 and is aligned with an ejection ram 59 which is utilized in removing molds from the press at the end of the curing cycle, as will be described more completely hereinafter.

Further, and as shown in Fig. 1, the press 20 may be provided with a conveyor 60 linking unloading platform 57 to the loading end of the machine to facilitate operation of the press by a single operator.

A cooling device 70 is supported underneath the portion of unloading platform 57 aligned with platens 32 and 33 and a similar cooling device 71 is mounted above this portion of the unloading platform. Cooling devices 70 and 71 may comprise conventional coils or pipes and may be provided with suitable connections 72 and 73 to afford a means for circulating a cooling liquid, usually water, through the cooling elements. In addition, it is usually desirable to afford some means for removing gases which may be generated in the press in the course of the curing process. For this purpose, the front of the press may be enclosed by a shield 75, as indicated in Fig. 1, and a hood 76 may be provided at the back thereof. In the illustrated embodiment, a conduit 77 is connected to hood 76 to afford a means for disposing of the gases developed as an incident to the curing process.

Fig. 7 illustrates, in a perspective view, a drawer-type mold which may be used with the press shown in Figs. 1–6; the mold 100 is also shown in detail in Figs. 9–11. The mold comprises a molding box 101 including a base member 102 to which four side members 103, 104, 105 and 106 are mounted. As seen in the perspective view of Fig. 7, members 103 and 104 comprise the top and bottom of the molding box whereas members 105 and 106 serve as the sides of the box, which is open at the one end 107. As best shown in Figs. 7 and 11, the top and bottom members 103 and 104 are pivotally mounted on base member 102 as by a pair of hinge pins 108 and 109 respectively. The pivotal movement of members 103 and 104 with respect to base member 102 is indicated in Fig. 11 by the dash outlines 103A and 104A; either of these two members may be pivoted approximately 90° with respect to the base member to afford convenient access to the interior of the molding blocks 101 as indicated in Fig. 7. If preferred, one of the members 103 and 104 may be affixed to base member 102 and the other may be pivotally connected thereto. It is preferred, however, that both of these side members be pivotally mounted so that it will not be necessary for the press operator to turn the mold over for loading if the mold is inadvertently placed upside down on the loading platform. With the construction illustrated in Fig. 11, members 103 and 104 are in effect interchangeable as the top and bottom sides of the mold, a feature which adds materially to the versatility and utility of the mold in operation.

The molding box 101 further includes provisions for mounting a die member 110 within the cavity defined by the walls of the molding box. Preferably, the internal die 110 is affixed to the base member 102 by some suitable means such as the bolts 111 which permit removal and replacement of the die. Die member 110 includes a central cavity 112 and end cavities 113 and 114 for receiving the lugs on the steel back of a railroad type brake shoe, as will be explained more completely hereinafter in connection with Figs. 8. The rigidity of the mold may be materially improved by further securing die 110 to the two side members 105 and 106 by suitable means such as the bolts 115 as indicated in Figs. 7 and 9.

The mold 100 further includes a second or external die member 117. The external dimensions of die 117 correspond closely to the internal dimensions of the open end 107 of the molding box 101; thus, the die 117 is adapted to be received in the open end 107 of the molding box to enclose the molding cavity. In operation, as will be explained more fully hereinafter, the die 117 is forced into the molding cavity as indicated by the arrows A in Figs. 7 and 9 to apply the requisite pressure during the curing operation in a press 20. In the illustrated embodiment, die 117 is provided with a series of pockets 119 in the sides thereof adjacent the top and bottom of the molding box 101; die 117 may also be provided with additional flash pockets 120 in the faces of the die adjacent the sides 105 and 106 of the molding box. Similar flash pockets 121 may be formed in the top and bottom side members of the molding box as indicated by the chambers 121 in top member 104 in Fig. 7, and, if desired, similar pockets may be formed in the surfaces of sides 105 and 106 of the molding box adjacent the open end 107 of the mold. It is not essential that pockets be provided in all of these different parts of the mold; indeed, in many instances it is preferable that flash pockets be provided only in the die 117. The location and size of these pockets is to some extent a matter of design choice and is at least partially dependent upon the amount of excess composition material which may be extruded from the molding cavity during the curing process.

Figure 8:
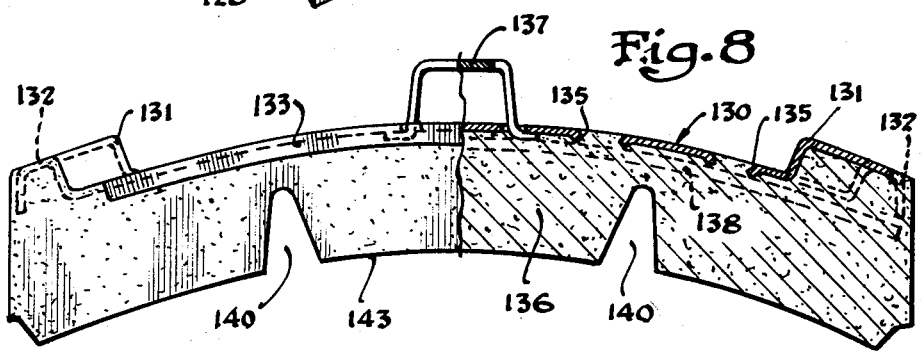
Fig. 8 is an elevation view, partly in cross section, of a composition-type railroad brake shoe fabricated in the mold illustrated in Fig. 7.

The press 20 and the mold 100 cooperate with each other in the fabrication and curing of brake shoes of the kind illustrated in Fig. 8. This particular brake shoe comprises a steel backing member 130, the ends of which are punched or otherwise deformed to form reinforcing elements for toe guides and end stops as indicated by reference numerals 131 and 132. In general, the steel reinforcing member 130 is of arcuate configuration and may be provided with depending flanges as indicated at 133; in addition, portions of the backing member may be punched out or otherwise deformed to form a series of locking elements 135 which aid in interlocking the steel with a composition body 136. A center lug 137 is suitably affixed to the steel reinforcing member 130 and is utilized in conjunction with the end stops and toe guides of the shoe to mount the brake shoe in a railway braking system. In addition, in many applications it may be desirable to embed an additional reinforcing member 138 in the composition body 136; this reinforcing member 138 is preferably formed from expanded metal or a similar metal mesh material.

It should be understood that the composition-type railway brake shoe illustrated in Fig. 8 is intended only to be illustrative of the general type of device which may be fabricated by molding apparatus constructed in accordance with the invention. This particular brake shoe is described and claimed in the co-pending application of William S. Fraula, Erwin R. Knauer, and Raymond E. Spokes, Ser. No. 603,407, filed August 10, 1956. As indicated in that application and as noted hereinabove, the composition body 136 of the brake shoe preferably comprises comminuted friction material intermixed with a thermosetting binder; additional binders and/or other materials may be employed depending upon the service in which the brake shoe is to be utilized. Moreover, and as indicated in Fig. 8, it is usually desirable to relieve the composition body of the brake shoe at one or more points as indicated by sections 140 thereof; these relieved portions in the brake shoe are defined in the curing process by means of suitable projections 141 on the face of the die member 117. Moreover, and as will be apparent from the drawings, the surface 142 of die 117 has a configuration corresponding to the desired configuration for the lower or braking surface 143 of the brake shoe body 136, whereas the surface 144 of the internal die 110 has a configuration corresponding to that of the steel backing member 130 of the brake shoe.

With the foregoing description of the structural attributes of the press and mold of the invention in mind, it is possible to understand fully the advantages and benefits to be derived in utilizing this apparatus in the manufacture of the brake shoe shown in Fig. 8. At the start of the molding operation, the press operator loads the mold 100 by inserting the steel back 130 for a brake shoe into the molding cavity adjacent die 110 as indicated in Figs. 7 and 9. The brake shoe back 130 is positioned so that lug 137 is received in the die cavity 112 and the end stop and toe guide portions of the back are received in the cavities 113 and 114 of the die. The expanded metal reinforce 138 is also placed in the die adjacent steel back 130. The composition material which is to form brake shoe body 136 is then placed in the mold.

If the mold were made large enough, it would be possible to load the composition material therein in particle form, the form in which it is usually originally compounded. Preferably, however, the composition material is first partially molded and cured to form a series of pre-forms 150, 151, and 152 as indicated in Figs. 7 and 9. By loading the mold with composition material pre-forms which have been partially cured and are in solid form, it is possible to reduce the overall size of the final curing mold substantially and also to reduce the overall size required for press 20 and to minimize the processing time required for the final curing step. Preferably, the pre-forms 150—152 are roughly shaped to correspond to the general configuration of the dies 110 and 117, although this is not essential. Moreover, it is usually dsirable to place a die member 153 within the lug 137 to prevent this member from filling up solidly with composition material during the course of the curing process.

When the mold 100 is fully loaded, as shown in Fig. 7, it is ready to be placed in the press 20 for processing; usually, loading of the mold is most conveniently carried out on the press-loading table 50. The mold 100 is then moved manually into the press to the position indicated in Fig. 3 at 100A. The press operator then actuates ram 51. The pressure block 53 of the ram engages the mold in position 100A and forces it in the direction indicated by arrows B in Figs. 3 and 4, moving the mold toward the platens 32 and 33 and tending to force the drawer-type die 117 into the molding cavity of the mold. As indicated in Figs. 3 and 4, a series of several molds is processed through the machine at one time and pressure is applied to all of the molds simultaneously by the ram 51 acting against the last mold in the series. It will be understood that at the outset, with the machine unloaded, it is necessary to place a series of empty molds or dummies in the machine in order to achieve the desired pressure effect on the first few molds being processed.

The forward stroke of the ram 51 forces the mold from position 100A to position 100B within the guide aperture 55 in block 28. Subsequently, the operator returns the ram to its original position as shown in Figs. 3 and 4. After the pressure from ram 51 has been released, ram 59 is actuated to eject the last mold 100C in the series onto the unloading table 57. The press is then able to receive another mold at the initial or starting position 100A and the process may be continued indefinitely. The mold from the unloading table may be moved onto the conveyor 60 by the operator so that the conveyor can transport the mold to a position adjacent table 50, thereby permitting the operator to load and unload the molds at the one location. In order to remove the completed brake shoe from the mold, it is only necessary for the operator to open one of the two hinged sides 103 and 104 and up-end the mold, shaking out the finished shoe.

As the molds traverse the press 20, they are subjected to heat applied to the platens 32 and 33 from heating elements 35 and 42. At the same time, the material within the molds is compressed by virtue of the pressure applied to the drawer-type molds by the ram 51. This application of heat and pressure to the thermosetting material in the molds may result in the generation of gases which are drawn off through hood 76 and conduit 77. The heat and pressure curing treatment may also cause some of the composition material to be extruded from the mold cavity. When this occurs, the excess material spills over into the flash pockets 119—121 and is thus maintained within the confines of the mold. The flash pockets thereby serve the important function of preventing any of the composition material from escaping from the mold and thereby fouling or jamming the press. The fixed platens 32 and 33 prevent any vertical expansion of the mold and therefore assure maintenance of adequate pressure on the mold contents in this direction. Similarly, the platen guide rails 37, 38, 44 and 45 prevent lateral expansion of the molds and thereby assure adequate pressure on the composition material from this direction.

The means selected for heating the platens 32 and 33 is not critical; preferably, electrical heating is employed because of the accurate temperature control possible with this type of heating arrangement, although other heating means may be utilized if desired. No control system has been shown for the heating apparatus or for the rams, since it is only necessary to provide suitable temperature control arrangements for the platens and starting and stopping controls for the two rams of the press. Any of many standardized suitable control devices may be employed for these purposes. Preferably, hydraulic rams are utilized in the press, although other rams may be employed if desired.

The fixed-platen structure of the press 20 is extremely advantageous from a cost standpoint, since it eliminates completely any necessity for the heavy and relatively expensive mechanical driving arrangements which might be required in a movable platen press. The only moving parts of the entire press mechanism are the two rams 51 and 59; in theory, ram 59 might be omitted but in practice is highly desirable since it would be extremely difficult for the operator to remove the final mold from position 100C manually. At the same time, the apparatus is extremely versatile, since only the external dimensions of the mold boxes need be maintained uniform to permit effective operation of the press in curing a wide variety of articles. Thus, by using different molding boxes having different internal and external dies, mold articles of completely different configuration may be processed simultaneously in the press. This is particularly advantageous when a series of small-quantity runs of differing devices are to be fabricated. At the same time, the press 20, in combination with the drawer-type molds exemplified by that shown in Fig. 7, retains the economic advantages inherent in a mass production process, since the press is capable of a relatively high output of molded devices. The press and the molds of the invention are particularly well adapted to the manufacture of combination metal and composition articles; the mold 100 affords a relatively economical and convenient structure which is highly effective in this type of work.

Hence, while we have illustrated and described the preferred embodiment of my invention, it is to be understood that this is capable of variation and modification, and we therefore do not wish to be limited to the precise details set forth, but desire to avail ourselves of such changes and alterations as fall within the purview of the following claims.

We claim:
1. Apparatus for curing thermosetting compositions under heat and pressure comprising: a pair of heated platens of predetermined length supported in fixed parallel relation with respect to each other and separated by a predetermined inter-platen spacing; a plurality of drawer-type molds each including an open-ended mold box defining a mold cavity for receiving the composition material to be cured, comprising a base member, a pair of end members rigidly affixed thereto, and a pair of side members pivotally mounted thereon, and a die member adapted to be received in the open end of the mold box and to be forced thereinto under pressure, each of the molds having a given width, a minimum length very much smaller than the length of the platens and a height approximately equal to the inter-platen spacing, at least one of said side and die members having a plurality of pockets formed in the sides thereof adjacent the open end of the mold box to receive and contain composition material which may be extruded from the mold cavity during curing; a reaction block disposed at one end of the platens and spaced therefrom by a predetermined distance larger than the minimum mold length; longitudinal guide members disposed on opposite sides of the platens and spaced by a distance approximately equal to the width of the molds to prevent lateral expansion thereof; and a ram, arranged for movement longitudinally of the platens and having a stroke at least equal to the maximum length of the molds, for impelling the molds serially through said inter-platen space in abutting relation to each other and into engagement with the reaction block, the abutting relation of the molds permitting a force generated by the ram to be transmitted through the mold boxes and die members to the reaction block to force each die member into its respective mold box.

2. Apparatus for curing thermosetting compositions under heat and pressure comprising: a pair of heated platens of predetermined length supported in fixed parallel relation with respect to each other and separated by a predetermined inter-platen spacing; a plurality of drawer-type molds each including an open-ended mold box defining a mold cavity for receiving the composition material to be cured, comprising a base member having a pair of end members and a pair of side members mounted thereon, at least one of said side members being pivotally mounted on said base member, and a die member adapted to be received in the open end of the mold box and to be forced thereinto under pressure, each of the molds having a minimum length very much smaller than the length of the platens and at a height approximately equal to the inter-platen spacing at least one of said side and die members having a plurality of pockets formed in the sides thereof adjacent the open end of the mold box to receive and retain composition material extruded from the mold cavity during curing; a reaction block disposed at one end of the platens and spaced therefrom by a predetermined distance larger than the minimum mold length; a first ram, arranged for movement longitudinally of the platens and having a stroke at least equal to the maximum length of the molds, for impelling the molds in series through said inter-platen space in abutting relation to each other and into engagement with the reaction block, the abutting relation of the molds permitting a force generated by the first ram to be transmitted through the mold boxes and die members to the reaction block to force each die member into its respective mold box; and a second ram positioned adjacent the reaction block and arranged for movement transversely of the platens to eject the last mold in the series upon retraction of the first ram.

References Cited in the file of this patent
UNITED STATES PATENTS

| | | |
|---|---|---|
| 1,321,897 | De France | Nov. 18, 1919 |
| 1,417,743 | Kempton | May 30, 1922 |
| 1,677,200 | Oakley | July 17, 1928 |
| 1,869,598 | Leguillon | Aug. 2, 1932 |
| 1,958,422 | Dinzl | May 15, 1934 |
| 2,359,674 | Pollock | Oct. 3, 1944 |
| 2,780,832 | Schmitt et al. | Feb. 12, 1957 |